US012284159B2

(12) United States Patent
Jenner et al.

(10) Patent No.: US 12,284,159 B2
(45) Date of Patent: Apr. 22, 2025

(54) SECURE COMMUNICATION SYSTEM

(71) Applicant: BAE SYSTEMS PLC, London (GB)

(72) Inventors: Stephen Matthew Allan Jenner, Bournemouth (GB); David James Sullivan, Bournemouth (GB); Benjamin Mark Lee, Bournemouth (GB)

(73) Assignee: BAE SYSTEMS PLC, London (GB)

( * ) Notice: Subject to any disclaimer, the term of this patent is extended or adjusted under 35 U.S.C. 154(b) by 140 days.

(21) Appl. No.: 17/924,436

(22) PCT Filed: May 18, 2021

(86) PCT No.: PCT/GB2021/051183
§ 371 (c)(1),
(2) Date: Nov. 10, 2022

(87) PCT Pub. No.: WO2021/234358
PCT Pub. Date: Nov. 25, 2021

(65) Prior Publication Data
US 2023/0179575 A1   Jun. 8, 2023

(30) Foreign Application Priority Data

May 21, 2020   (EP) ...................................... 20275092
May 21, 2020   (GB) ...................................... 2007586

(51) Int. Cl.
*H04L 9/40*      (2022.01)
*H04L 12/46*     (2006.01)
(Continued)

(52) U.S. Cl.
CPC ........ *H04L 63/029* (2013.01); *H04L 12/4633* (2013.01); *H04L 45/02* (2013.01); *H04L 45/58* (2013.01)

(58) Field of Classification Search
CPC ... H04L 63/029; H04L 12/4633; H04L 45/02; H04L 45/58; H04L 45/26; H04L 45/50; H04L 63/061; H04L 63/0464
See application file for complete search history.

(56) References Cited

U.S. PATENT DOCUMENTS 9,455,959 B1 *   9/2016   Garg ................... H04L 63/0281
11,463,359 B2 *  10/2022  Tamizkar ............. H04L 45/586
(Continued)

FOREIGN PATENT DOCUMENTS

EP         2227883 B1      5/2012

OTHER PUBLICATIONS

International Search Report and Written Opinion dated Sep. 6, 2021 issued in PCT/GB2021/051183.
(Continued)

*Primary Examiner* — Abiy Getachew
(74) *Attorney, Agent, or Firm* — Scully, Scott, Murphy & Presser, P.C.

(57) ABSTRACT

A router node comprises a link discovery module, a security module, a secure access module and storage. The link discovery module discovers a link to an adjacent router node and receives its first loopback address. The link discovery module creates a first tunnel between the security module in the router node and the first loopback address. The security module receives a second loopback address for the second router node, and creates a second tunnel. The security module repeats the discovering, receiving and creating steps for each router node adjacent to the first router node. The storage separately stores a link discovery routing table which comprises information relating to the links between the router node and each adjacent router note; a security (Continued)

routing table which stores the unique first loopback address; and a secure access routing table which stores the unique second loopback address.

20 Claims, 5 Drawing Sheets

(51) Int. Cl.
*H04L 45/02* (2022.01)
*H04L 45/58* (2022.01)

(56) References Cited

U.S. PATENT DOCUMENTS

| | | | | |
|---|---|---|---|---|
| 2006/0153067 A1* | 7/2006 | Vasseur | ............... | H04L 45/03 370/242 |
| 2010/0284305 A1* | 11/2010 | Papp | ............... | H04L 45/50 370/254 |
| 2015/0222522 A1* | 8/2015 | Lingafelt | ............... | H04L 45/54 370/392 |
| 2017/0346736 A1 | 11/2017 | Chander et al. | | |
| 2018/0351882 A1 | 12/2018 | Jeganathan et al. | | |
| 2019/0132150 A1* | 5/2019 | Ramachandran | ... | H04L 12/4633 |

OTHER PUBLICATIONS

Extended EP Search Report dated Aug. 21, 2020 issued in EP 20275092.3.
GB Search Report dated Jan. 14, 2021 issued in 2007586.7.
Behringer S Bjarnason Balaji BL T Eckert Cisco M: "An Autonomic Control Plane; draft-behringer-anima-autonomic-control-plane-02. txt", An Autonomic Control Plane; Draft-Behringer-Anima-Autonomic-Control-Plane-02.txt, Internet Engineering Task Force, IETF; Standardworkingdraft, Internet Society (ISOC) 4, Rue Des Falaises CH-1205 Geneva, Switzerland (Mar. 6, 2015), pp. 1-16.

* cited by examiner

SECURE COMMUNICATION SYSTEM

FIELD OF THE INVENTION

The present invention relates to a secure communication system.

BACKGROUND

A deployed IP network typically comprises a plurality of routing nodes. When implementing a network solution, the design considerations including designing "plug and play" solutions, implementing intelligent routing and provide a secure solution, e.g. one which is resistant from cyber threats.

For a "plug and play" solution, routing nodes must be easily connectable together with minimal user configuration. Pre-deployment planning is used ensuring that routing logic is not tied to physical connections. For instance, when nodes A, B, C, D are deployed, a plug and play solution means that they can be connected in any topology and the system will be able to form a logical network without changing node or link identity configuration. For intelligent routing, the path from source node to destination node is calculated based on a suitable metric, e.g. shortest path or lowest cost, which may be learnt and/or updated. When routing IP packets, the best path is chosen based on the metrics for the current network topology.

For a secure solution, critical networking functions are typically protected from DoS attacks from external systems and bearers. Such secure solutions may be required for sensitive applications, e.g. networks used for military or similar purposes. Examples of such protection include firewalls and IPSec tunnel barriers. The protection may require manual configuration of the connections between nodes which prevents a "plug and play" solution. The protection may also obscure the routing path and metrics which may prevent the intelligent routing from being realized. Thus, the three design considerations are typically considered to be conflicting requirements.

The present applicant has recognized that sensitive networks may be frequently re-deployed, sometimes at short notice. Maintaining "plug and play" functionality can therefore be especially important in such situations. An alternative solution for creating secure communications systems is thus required.

SUMMARY

Embodiments of the present invention are intended to address the above technical problems.

According to an aspect of the present invention, there is provided a method of creating a secure network, the method comprising:
  connecting a first router node to the network;
  discovering, using the first router node, a link to an adjacent router node within the network;
  receiving, at the first router node via the discovered link, a first loopback address for the adjacent router node, wherein the first loopback address is an address for a security module in the adjacent router node and is a network wide unique address;
  creating a first tunnel between a security module in the first router node and the received first loopback address;
  receiving, at the first router node via the first tunnel, a second loopback address for the second router node, wherein the second loopback address is an address for a secure access module in the second router node and is a network wide unique address;
  creating a second tunnel between a secure access module in the first router node and the received second loopback address;
  repeating the discovering, receiving and creating steps for each router node which is adjacent to the first router node;
  storing information relating to the links between the first router node and each adjacent router note in a link discovery routing table;
  storing the unique first loopback address for each adjacent router node in a security routing table; and
  storing the unique second loopback address for each adjacent router node in a secure access routing table;
  whereby each discovered link, first tunnel and second tunnel provide separate connections between the first router node and each adjacent router node.

Preferably, the first loopback address is a network wide unique address which is dependent on the discovered link. Alternatively, the first loopback address is a network wide unique address which is independent of the discovered link. Preferably, the second loopback address is a network wide unique address which is dependent on the discovered link and the first loopback address. Alternatively, the second loopback address is a network wide unique address which is independent of the discovered link and the first loopback address.

The network may comprise a plurality of router nodes which may be connected by any appropriate topology. Adjacent router node are ones which are directly connected within the network. Other router nodes may be indirectly connected, e.g. using a mesh topology and it will be appreciated that in such arrangements there may be several hops from one router node to another router node. Thus it will be appreciated that the repeating step may only carried out for some of the router nodes within the network.

By providing three separate connections (i.e. the link, the first tunnel and the second tunnel) between the first router node and each adjacent router node, a risk of an attacker penetrating the network is reduced even if they are able authenticate with a peer via the link. Each of the link discovery table, the security routing table and the secure access table may be considered to be virtual routing and forwarding (VRF) tables. It will be appreciated that the tables may alternatively be termed first, second and third tables. As detailed in the method above, no user configuration is required for the pairs of adjacent nodes to form the three separate connections. Accordingly, each router node may effectively just be "plugged" into the network. Each of the first and second tunnels may be configured prior to use to enable plug and play behaviour.

The steps above are those at the first router node and it will be appreciated that these steps may be mirrored at each router node. According to another aspect of the invention, there may be provided a router node which is configured to implement the method above.

For example, according to another aspect of the invention, there is provided a router node comprising a link discovery module, a security module, a secure access module, and storage;
  wherein the link discovery module is configured to
    discover a link to an adjacent router node in a network to which the router node is connected;
    receive a first loopback address for the adjacent router node, wherein the first loopback address is an address for a security module in the adjacent router node and is a network wide unique address;

create a first tunnel between the security module in the router node and the received first loopback address;

wherein the security module is configured to receive a second loopback address for the second router node, wherein the second loopback address is an address for a secure access module in the second router node and is a network wide unique address; and create a second tunnel between the secure access module in the router node and the received second loopback address;

repeating the discovering, receiving and creating steps for each router node which is adjacent to the first router node; and wherein the storage is configured to separately store a link discovery routing table which comprises information relating to the links between the router node and each adjacent router note; a security routing table which stores the unique first loopback address for each adjacent router node; and a secure access routing table which stores the unique second loopback address for each adjacent router.

The following features apply equally to the method and the router node.

Creating one or both of the first tunnel and the second tunnel may comprise using generic routing encapsulation (GRE). Creating one or both of the first tunnel and the second tunnel may comprise creating a virtual private network (VPN) connection between the first router node and each adjacent node. The discovered link may be authenticated, e.g. using MD5, before sharing (e.g. sending or receiving) any first loopback addresses.

Creating the first tunnel may comprise applying security to the first tunnel before receiving the second loopback address. For example, Internet Protocol Security may be applied to create an IPSec tunnel, thus providing an assured channel for incoming user traffic. This may enhance security within the network.

The method may further comprise storing a cost for each first tunnel in the security routing table. The cost may be used for intelligent routing.

At least one of the link, the first tunnel and the second tunnel may use the open shortest path first (OSPF) routing protocol. The link may be a wide area access (WAN) link. A local area network (LAN) may be connected to the first router node (which may thus be termed a local router node) and/or each adjacent router node. The method may further comprise storing details of any LAN connected to the adjacent router node. The first router node may advertise details of the LAN connected thereto. The secure access module may be connected to the LAN, e.g. via a firewall.

The first router node may mirror the steps at the adjacent router node. The method may further comprise sending to the adjacent router node, via the discovered link, a first loopback address for the security module in the first router node wherein the first loopback address is an address which is uniquely provided to the adjacent router node; and sending to the adjacent router node via the first tunnel, a second loopback address for the secure access module in the first router node wherein the second loopback address is an address which is uniquely provided to the adjacent router node.

The first router node may be pre-configured with all the loopback addresses that it requires to provide a unique first loopback address and a unique second loopback address to each adjacent router node. The method may comprise pre-configuring the first router node with a plurality of first loopback addresses corresponding to the number of nodes within the network and a plurality of second loopback addresses corresponding to the number of nodes within the network. By unique, it is meant that each loopback address is only provided to one adjacent router node and is a network wide unique address. Preferably, each loopback address is dependent on the locally connected discovered logical link. Alternatively, each loopback address is independent of the locally connected discovered logical link.

According to another aspect there is provided a method of routing traffic across a secure network created using the method described above. According to another aspect there is provided a network comprising a plurality of interconnected router nodes as described above. The router nodes may be arranged in any suitable network topology. The network may be considered to comprise three separated layers across the network topology: a link discovery layer providing a plurality of links between adjacent router nodes, a security layer providing a plurality of first tunnels, one between each pair of adjacent router nodes and a secure access layer providing a plurality of second tunnels, one between each pair of adjacent router nodes.

The method of routing may comprise using intelligent routing when routing user traffic through the first tunnels between the first router node and each adjacent router node, for example based on costs stored in the security routing table. The security module may thus be configured to use intelligent routing to determine an optimal (e.g. lowest cost) path through the network from source to destination. It may thus be considered that the security layer may be configured to provide intelligent routing, e.g. by the security modules calculating lowest cost routes across the network). As described above, plug and play behaviour may be provided by the tunnels within each of the security layer and the secure access layer. As described above, the first loopback address which allows the first tunnel to be created is discovered by the link discovery module. Similarly, the second loopback address which allows the second tunnel to be created is discovered by the secure access module. Accordingly, the link discovery layer and the secure access layer may be considered to provide the plug and play behaviour.

The method may comprise selecting which of the first and second tunnels to use to route incoming user traffic. For example, selecting may be based on whether the incoming user traffic is to transit to a trusted service. The method may further comprise routing incoming user traffic through the second tunnel when the service is trusted and routing incoming user traffic through the first tunnel when the service is not trusted.

According to a further aspect of the present invention there is provided a computer readable medium, or circuit, storing a computer program to operate methods substantially as described herein.

It will be appreciated that features described in relation to one aspect of the present invention can be incorporated into other aspects of the present invention. For example, an apparatus of the invention can incorporate any of the features described in this disclosure with reference to a method, and vice versa. Moreover, additional embodiments and aspects will be apparent from the following description, drawings, and claims. As can be appreciated from the foregoing and following description, each and every feature described herein, and each and every combination of two or more of such features, and each and every combination of one or more values defining a range, are included within the present disclosure provided that the features included in such a combination are not mutually inconsistent. In addition, any feature or combination of features or any value(s) defining a range may be specifically excluded from any embodiment of the present disclosure.

BRIEF DESCRIPTION OF THE DRAWINGS

Embodiments of the invention will now be described by way of example only and with reference to the accompanying drawings.

DETAILED DESCRIPTION

Figure 1:
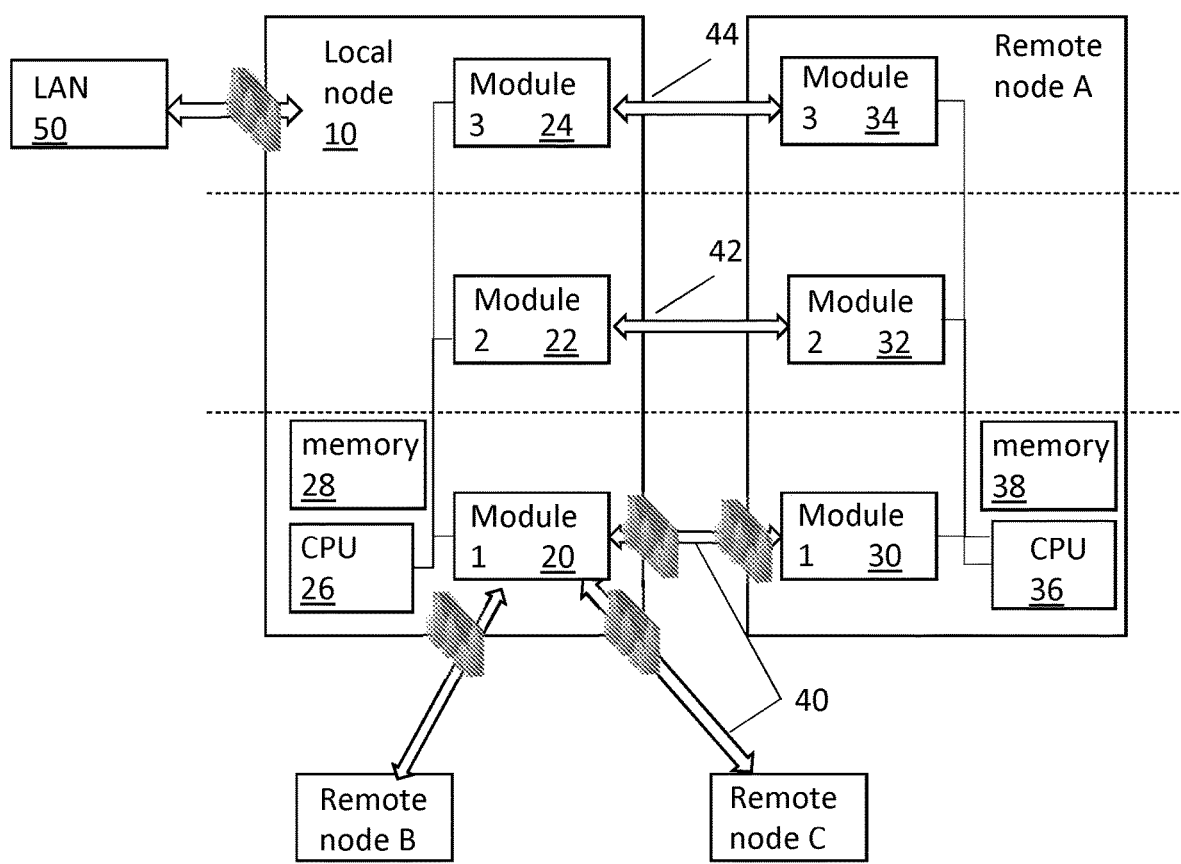
FIG. 1 is a system architecture showing an example embodiment.

FIG. 1 schematically shows an example embodiment comprising a local router node 10 connected to three remote router nodes A, B, C, e.g. via a wide area network (WAN). The local router node 10 is connected, for example via a firewall to a local area network 50 (LAN) comprising a plurality of nodes which may be connected in any appropriate way using any suitable routing protocol. Each remote router node A, B, C may also be connected to its own independent LAN (not shown). It will be appreciated that three remote router nodes are merely illustrative and the local router node 10 may be connected to any number of remote nodes. By remote, it is meant that the remote router node does not form part of the LAN to which the local router node is connected.

Some of the internal detail of the local router node 10 and the remote node A is shown in FIG. 1. Each of the nodes may be a suitable router (e.g. a Cisco™ CSR1000V router). Alternative embodiments can use different software or hardware, such as Juniper™, which uses "Route Distinguishers" to map routing protocols between customer edge and provider edge routing instances (VRF's). In yet another alternative embodiment a NOKIA™ VPRN may be used. This separates the routing instances by Virtual Private Routing Networks (VPRN) and also uses "Route Distinguishers" to map between routing instances (as per Juniper).

Each of the nodes will include the standard components of whichever hardware solution deployed, including for example a processor 26, 36 and a memory 28, 38. It will be appreciated that there may be other standard components which are omitted for clarity. As explained in more detail below, a virtual routing and forwarding (VRF) table may be stored in each node, e.g. in the memory 28, 38.

Each router node comprises three modules each having a separate interface through which they are connectable to corresponding modules in an adjacent router node. The local router node 10 comprises a first module which may be termed a link discovery module 20, a second module which may be termed a security module 22 and a third module which may be termed a secure access module 24. The link discovery module 20 of the local router node 10 is connected, e.g. via firewalls, to a link discovery module 30 in remote router node A. The security module 22 of the local router node 10 is connected via a first tunnel 42 to a security module 32 in remote router node A. The secure access module 24 of the local router node 10 is connected via a second tunnel 44 to a third module 34 in remote router node A. The tunnels are formed as described below and it will be appreciated that similar connections may be formed between local router node 10 and other similarly configured remote router nodes such as remote router nodes B and C.

In the commercial environment virtual routing and forwarding (VRF) is typically used to separate network traffic from different user communities using the same physical hardware. For example, if a business has a finance and sales team and does not want the sales team to have access to the secure finance server, they can be separated by either using separate physical hardware, or use the same hardware and use VRF to separate the finance and sales network traffic.

As shown in FIG. 1, VRF is used to split a physical router into three routing layers or instances which are schematically illustrated by the dashed lines. Embodiments of the present invention thus apply VRF technology to the deployed network space. As explained in more detail below, embodiments can use VRF to separate discovery of remote router nodes into the link discovery modules of the router nodes with the modules connected together to form a first link discovery layer. System wide intelligent routing functions may be provided in the other layers so that if an attacker manages to authenticate with a peer instance via the WAN then they will only be able to affect that WAN link, not the entire network. Intelligent routing functions together with encryption and "plug and play" operation may be supported by a second layer which may be termed a security layer with the security modules connected together. The third layer is a secure access layer comprising the secure access modules which provides an appropriately secure route relative to the incoming traffic (e.g. as determined by the bearer service).

The second tunnel 44 between each secure access module 24, 34 may use any suitable protocol, including generic routing encapsulation (GRE). Similarly, the first tunnel 42 between each security module 22, 32 may also use any suitable protocol such as GRE. Such tunnels provide secure routes for user traffic. The second, secure access tunnel may be used for incoming user traffic, which may be encrypted or unencrypted, and transiting trusted external networks and the first, security tunnel may be used when incoming traffic is transiting untrusted links. Plug and play solutions may be pre-configured using the second, secure access tunnels between every possible source/destination router node so that all WAN interfaces discovered are routable with minimal user configuration. As explained below, each tunnel between the secure access module is built and routed across the network using the accurate metrics of the security layers.

Each of the first and second tunnels may be configured prior to use to enable plug and play behaviour. For example, a tunnel in each layer may be preconfigured to every possible endpoint, i.e. every other node so that should a new node be connected, an appropriate tunnel will build to it with the appropriate security parameters. The security layer may also be configured to ensure intelligent and assured routing, maintain plug and play ability and protect system-wide routing using tunnels 42. As explained below, each security tunnel 42 may be built in the security layer on a per link basis, using any suitable protocol such as internet protocol security (IPSEC) GRE. The routing instance in the security layer can build across the tunnels and create a single routing area across the deployed network. All the routes in the security layer are in one large routable area and thus a secure access VRF routing table can establish direct connection with all available endpoint nodes. All routing cost metrics may be handled in this layer and will be accurate against WAN link capabilities ensuring intelligent routing.

Figure 2:
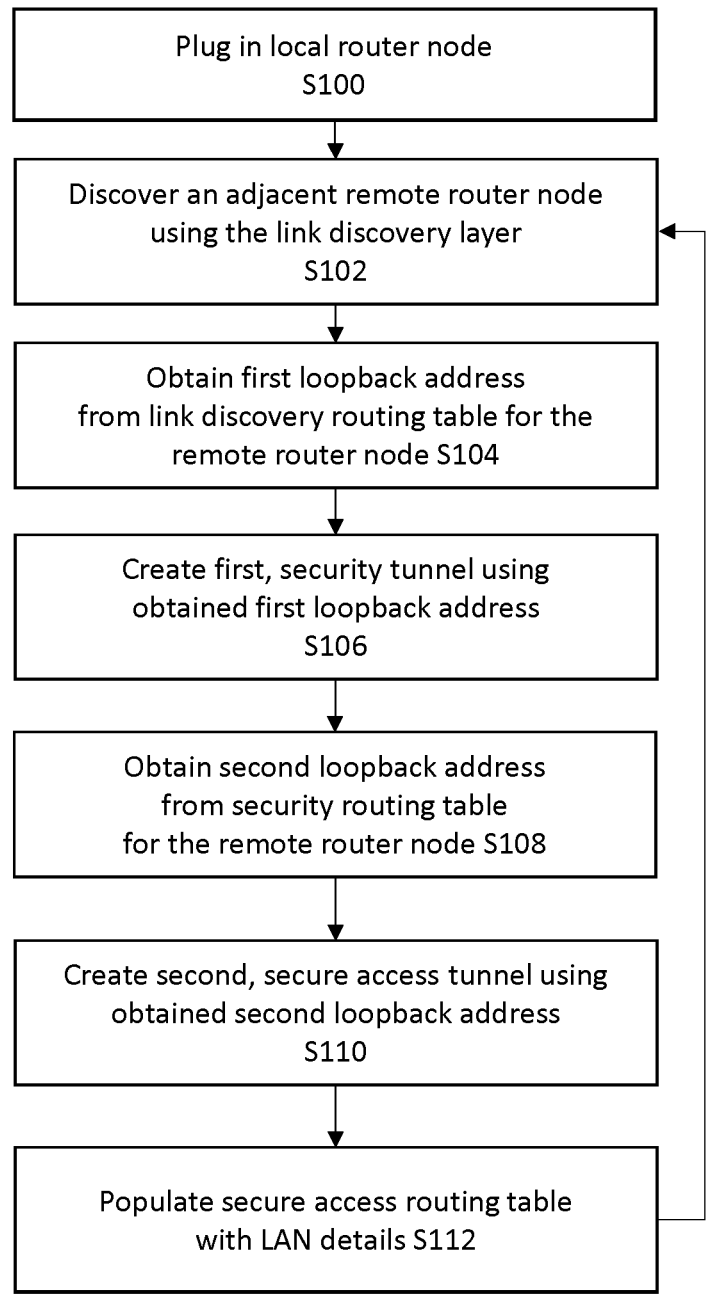
FIG. 2 is a flowchart for a method of establishing a secure connection within the system architecture of FIG. 1.

FIG. 2 is a flowchart depicting the steps in connecting adjacent modules in the three separate layers and FIGS. 3A to 3F schematically illustrate the links between modules in the three layers being created.

Figure 3A:
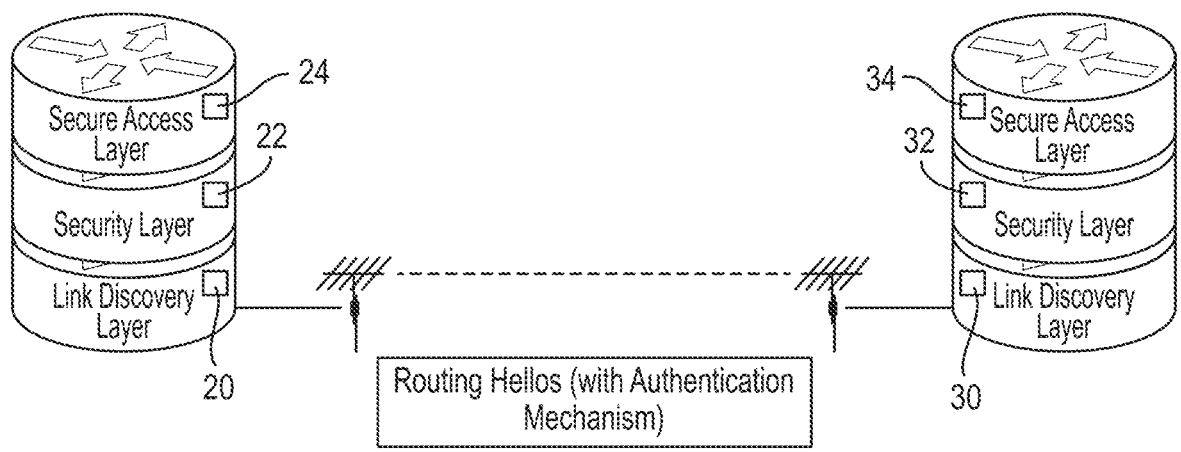
FIGS. 3A-3E schematically illustrate how the method of FIG. 2 can establish a link between two router nodes.

In a first step S100, a local router node is plugged into the wide area network (WAN), i.e. the local router node is connected into the network via a bearer (e.g. radio, satellite, cable). The local router node is a router node of a bearer service (also termed a data service) that provides for transmission of user data. The next step S102 is to automatically discover an adjacent remote router node using the link discovery layer. Any appropriate protocol, for example open shortest path first (OSPF) or border gateway protocol (BGP) may be used to route traffic to a neighbouring remote router node. As illustrated in FIG. 3A, the local router node may use its link discovery module 20 to route hello traffic to the link discovery module 30 in a neighbouring remote router node. The link discovery routing information may be authenticated, e.g. using the message digest algorithm MD5 or a similar suitable technique.

Returning to FIG. 2, the next step S104 is to learn the IP addresses tied to the link discovery module of the remote router node together with a first unique loopback address for the remote router node. The WAN interfaces of each router node (remote and local) may be configured with an IP address dependent on the type of connection (e.g. layer 2, layer 3, etc) together with incorporating a node ID into the IP schema to make sure no addresses overlap. An example 8 port configuration is displayed below where C is the connection type and P is the port number within the range:

| Interface Type | Port Number (Physical) | IP Address | EXAMPLE (Node 20) |
|---|---|---|---|
| L2 Low Speed | 1 | 10.(C + P).1.NN/24 | 10.11.1.20 |
| L2 Low Speed | 2 | 10.(C + P).1.NN/24 | 10.12.1.20 |
| L3 Med Speed | 3 | 10.(C + P).NN.NN | 10.51.20.20 |
| L3 High Speed | 4 | 10.(C + P).NN.NN/24 | 10.61.20.20 |
| L3 High Speed | 5 | 10.(C + P).NN.NN/24 | 10.62.20.20 |
| FALCON BIPGW | 6 | 10.(C + P).1.NN/24 | 10.111.1.20 |
| FALCON BIPGW (C2) | 7 | 192.168.255.1/24 | 192.168.255.1/24 |
| FALCON B4 | 8 | 10.(C + P).1.NN* | 10.101.1.20 |

*Default IP address to be changed manually when connecting into a Falcon node.

The connection type index may be as set out below

| Connection type | C = |
|---|---|
| L2 Low Speed | 10 |
| L2 Med Speed | 20 |
| L2 High Speed | 30 |
| L3 Low Speed | 40 |
| L3 Med Speed | 50 |
| L3 High Speed | 60 |
| SATCOM Low Speed | 70 |
| SATCOM Med Speed | 80 |
| SATCOM High Speed | 90 |
| Band 4 Default IP | 100 |
| FALCON BIPGW | 110 |

The link discovery interface of the remote router node sends routing exchanges, such as hellos, ID, interval parameters, MTU and routing tables, to the link discovery module of the local router node:

Int Gi0/1
VRF forwarding link discovery layer
IP address 10.1.1.2 255.255.255.0
Int Loopback0
VRF forwarding link discovery layer
IP address 10.10.1.2 255.255.255.255

The loopback address is a network wide unique address which is advertised and used to build a tunnel between the local router node and the remote router node. The loopback address may be independent of the discovered link, or dependent on the discovered link. Each routing instance between two nodes (i.e. each link type) may require its own pair of network wide, unique loopback address; one for each of the local router node and the remote router node. As described below, the uniqueness of the loopback address may be determined by the link speed port number and the mode number. The VRF is the routing instance rather than the connection between routers and as such the VRF is locally significant.

The link discovery layer routing table within the local router node may be updated with the link discovery loopback address for the remote router node. An example of a link discovery layer routing table within the local router node is shown below (C denotes connected, L denotes local and O denotes the protocol in this case OSPF):

| | Address detail | Interface |
|---|---|---|
| C | 10.1.1.0/24 is directly connected | Gi0/1 |
| L | 10.1.1.1/32 is directly connected | Gi0/1 |
| O | 10.10.1.2 (110/1) via 10.1.1.2 | Gi0/1 |
| C | 10.10.1.1 is directly connected | Loopback0 |

The security module in the local router node can now see its tunnel destination in the remote router node (i.e. 10.10.1.2). Thus, the security tunnel moves to an "up" state, i.e. a state in which the tunnel can be formed. It will be appreciated that the local router node may advertise similar information about itself to the remote router node so that the remote router node can see its tunnel destination in the local router node.

Figure 3B:
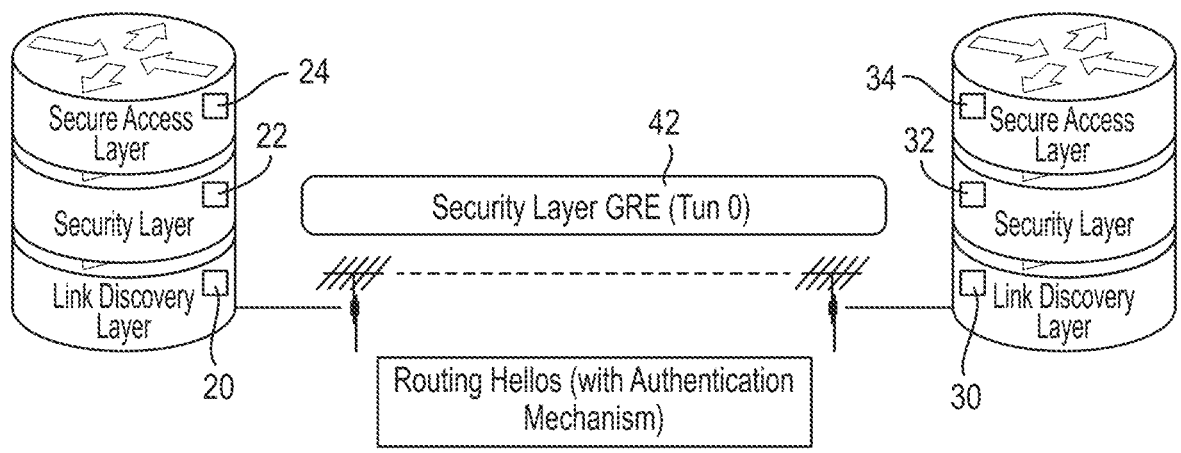

The next step S106 is create a first tunnel in the security layer using the obtained loopback address. The creation of the first, security tunnel 42 is illustrated in FIG. 3B. Details of one example of such a tunnel are shown in the table below:

| Int Tun 0 (also termed security tunnel) | |
|---|---|
| VRF Layer | Security layer |
| Tunnel Source | Loopback 0 |
| Tunnel Destination | 10.10.1.2 |
| IP address | 50.50.50.1/30 |
| IP cost (OSPF) | 100 |
| Tunnel protection IPSec profile | IPSec1 |

The tunnel destination is the loopback address which was advertised by the remote router node and which has the detail in the link discovery routing table of "10.10.1.2 (110/1) via 10.1.1.2".

The tunnel may use generic routing encapsulation (GRE) and may be part of a virtual private network (VPN). The tunnel may use the routing protocol OSPF (or another suitable protocol such as BGP). Internet Protcol Security (IPSec) may be formed over the tunnel, for example using pre-shared keys configured at both ends. The key will be configured before initial delivery and each node will hold a unique password. After an IPSec connection is formed, hellos may be sent over the newly IPSec protected tunnel. As shown in the table above, the tunnel has an associated cost which is derived from the physical WAN link performance characteristics assigned to them to form the basis of an intelligent routing infrastructure.

Figure 3C:
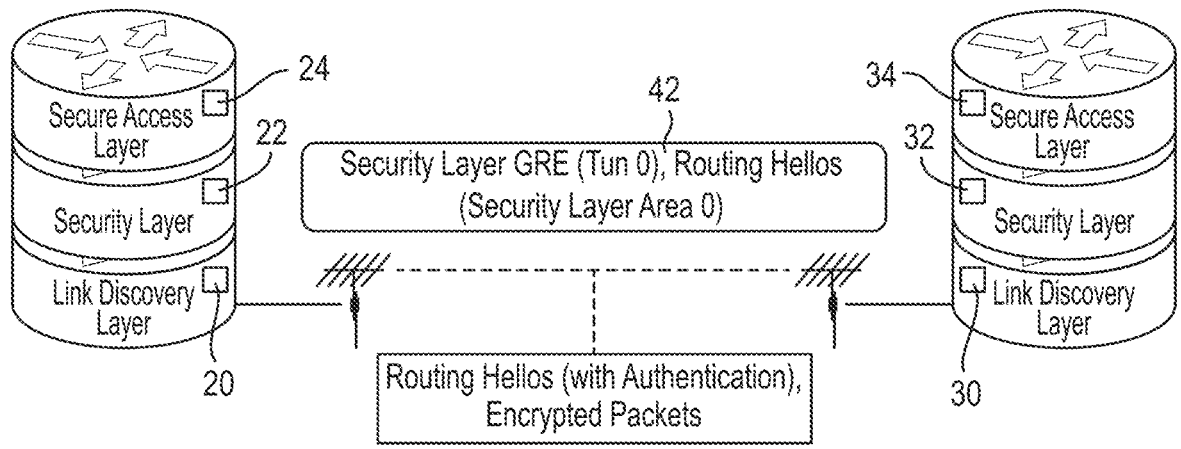

As illustrated in FIG. 3B, the tunnel 42 directly connects the security module 22 in the local router node with the security module 32 in the remote router node. Once the tunnel 42 is connected, routing hellos and protection forms may be sent from the local router node to the remote router node as illustrated in FIG. 3C. All traffic from the bearer service connected to the local router node is now either routing hellos or encrypted traffic. The tunnel 42 is separate from the WAN links between the link discovery modules which are the exterior facing interfaces. Accordingly, the tunnel is not compromised by an external attack on the WAN links between the nodes which are handled via the link discovery modules.

Returning to FIG. 2, the next step S108 is to obtain, via the first tunnel 42, a second loopback address for the remote router node which is advertised across the tunnel. The second loopback address may be termed a security loopback address. The security module of the remote router node sends the following data regarding the IP addresses and associated netmask to the security interface of the local router node:
Int Tun0
VRF forwarding security layer
IP address 50.50.50.2 255.255.255.0
Int Loopback1
VRF forwarding security layer
IP address 11.11.1.2 255.255.255.255

The security routing table of the local router node may be updated with this information on the unique loopback address and an example of such a table is shown below:

|   | Address detail | Interface |
|---|---|---|
| C | 50.50.50.0/30 is directly connected | Tun0 |
| L | 50.50.50.1/32 is directly connected | Tun0 |
| O | 11.11.1.2 (110/1001) via 10.1.1.2 | Tun0 |
| C | 11.11.1.1 is directly connected | Loopback1 |

The secure access module in the local router node can now see its tunnel destination (i.e. 11.11.1.2) in the remote router node and thus the secure access tunnel moves to an "up" state, i.e. a state in which it can form. It will be appreciated that the local router node may advertise similar information about itself to the remote router node so that the remote router node can see its tunnel destination in the local router node.

The next step S110 is create a second tunnel using the second obtained loopback address. The second tunnel is created in the secure access layer and may thus be termed a secure access tunnel. The creation of the tunnel 44 is illustrated in FIG. 3C. Details of one example of such a tunnel are shown in the table below:

| Int Tun 1 | |
|---|---|
| VRF Layer | Secure access layer |
| Tunnel Source | Loopback 1 |
| Tunnel Destination | 11.11.1.2 |
| IP address | 60.60.60.1 |
| Net mask | 255.255.255.252 |

The tunnel destination 11.11.1.2 is the loopback address which was advertised by the remote router node and which has the detail in the security routing table of "11.11.1.2 (110/1001) via 10.1.1.2". It is noted that the IP address 10.1.1.2 is the IP address discovered via the link discovery layer connections which is connected to the first loopback address 10.10.1.2. By having the link discovery VRF as a separate routing instance, the same IP subnets can be configured on each link type of every node without any routing conflicts. This means the nodes can be factory set with no user interaction and when WAN links are connected, the link discovery module will auto-discover the remote end, enabling the security tunnel to be formed and thereafter the secure access tunnel to be formed.

The second tunnel may use the routing protocol OSPF (or another suitable protocol such as enhanced interior gateway routing protocol EIGRP depending on connection type). In this example, OSPF is used as the protocol as denoted by the value "110" and an associated cost is "1001". The cost may vary between 1001 to 1003 depending on how many routers are deployed per node. 1000 is the cost for the tunnel and 1 for every hop to a directly connected router). There is no need to assign a cost to that route as the intelligent routing is handled in the secure access layer.

Each tunnel may use generic routing encapsulation (GRE). There is typically no need to have any form of tunnel protection (e.g. IPSec) because the secure access layer encrypts all of the traffic leaving the node, unless the data is from a trusted bearer, in which case the data is protected using external encryption appropriate to the bearer. Merely as examples, the table below illustrates the bearer types and appropriate security measures:

| BEARER | TRUSTED/NOT TRUSTED | Security Barrier |
|---|---|---|
| B4 Falcon | TRUSTED | HG Crypto |
| iBoO | TRUSTED | Soho Crypto |
| SATCOM | TRUSTED | BIPGW |
| L2 Bearer | NOT TRUSTED | vCore/NSX |
| L3 Bearer | NOT TRUSTED | vCore/NSX |

Figure 3D:
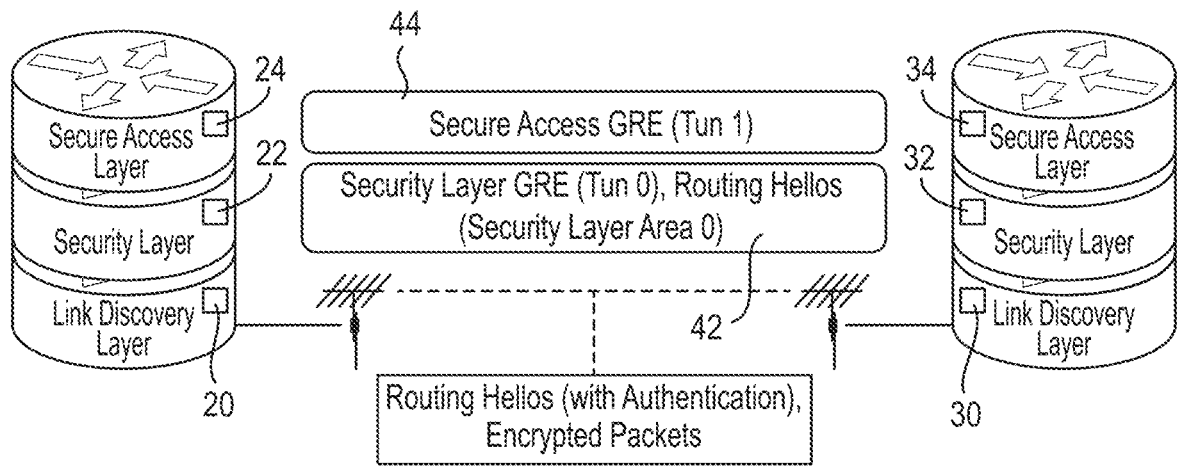
Figure 3E:
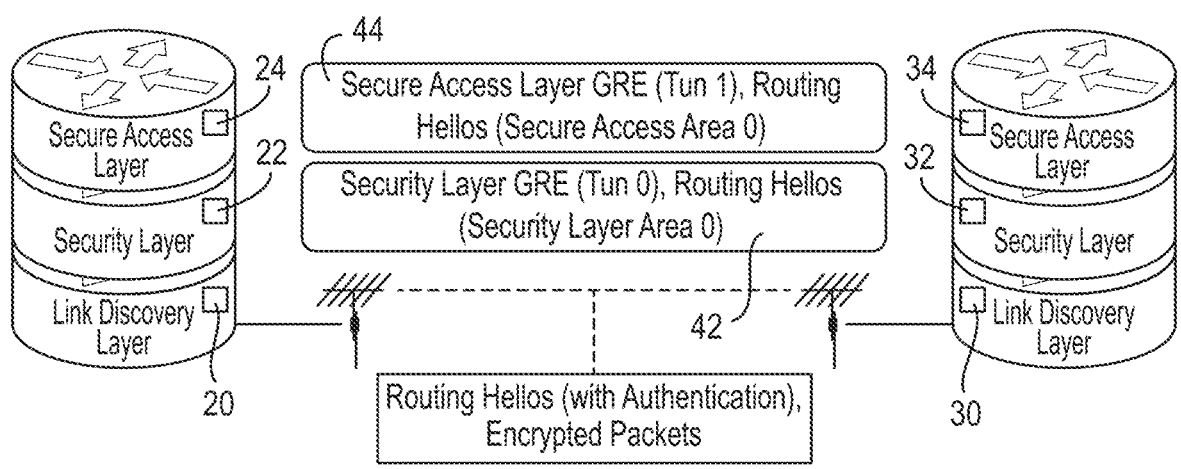

As illustrated in FIG. 3D, the second tunnel 44 directly connects the secure access module 24 in the local router node with the secure access module interface 34 in the remote router node. Once the tunnel 44 is connected, routing hellos may be sent from the local router node to the remote router node as illustrated in FIG. 3E.

As illustrated in FIG. 1, each local router node is connected to a LAN and in step S112 of FIG. 2, the secure access routing table of the remote router node is populated with details of the LAN which is connected to the local router node. Similarly, the secure access routing table of the local router node may be populated with details of all LANs which are connected to the remote router node, either directly or via other remote router nodes. As shown, the process may loop back to step S102 to discover other remote router nodes. Although it will be appreciated that all nodes may be simultaneously discovered. Once the process is complete, user data is able to securely transit across the appropriate connection set up between the local and remote router nodes.

Thus, the method creates a minimum of two tunnels (preferably GRE). The second tunnel 44 is separate from the first tunnel 42 and is also separate from the links between the link discovery modules. It will be appreciated that the number of tunnels required will increase in proportion to the network.

This implementation can also enable "plug and play" operation. In other words, a node can be connected to any similar node in a network without making configuration changes. This is achieved by configuring tunnels for each possible node in the network. For example, if there are 200 other nodes in the network, there will be at least 200 pre-configured secure access tunnels, e.g. a minimum of one per node. There may also need to be additional secure access tunnels depending on the nature of the network. There also need to be security tunnels, with a minimum of one tunnel for every possible link to that node. The number of security tunnels is dependent on the connection types within the link discover layer because a tunnel must be configured for each interface with a cost for each connection type. The formula below indicates the total number of security tunnels c which may be required for each node:

$$((I \times S \times P) + (In \times P)) \times N = c$$

where
N=Total number of Nodes in the network
I=Total number of interface types with variable speeds—High, Medium, Low
In=Total number of interface types with a fixed speed
S=speed variables of interface types (i.e. High Speed, Low speed)
P=number of possible ports of an interface type For example, when there are 200 nodes, three interface types having variable speeds (layer 2, layer 3, Satcom), three interface types having fixed speed (Band 4, BIGPW Falcon, BIPGW C2), three speed variables, (high, medium, low) and a maximum of 3 WAN bearers, the equation above shows that 7200 tunnels are required ((3×3×3)+(3×3))×200).

It is noted that although there are potentially many tunnels in the security layer, the only tunnels which transition to an "up" status are the ones with directly connected neighbours.

Figure 4:
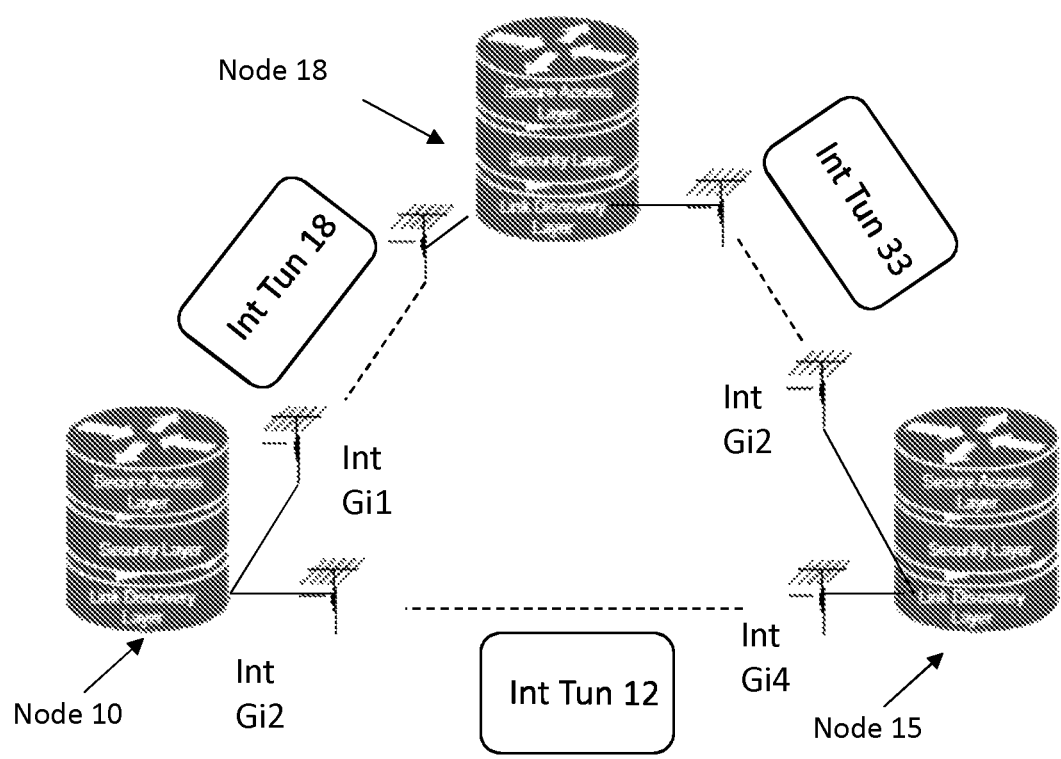
FIG. 4 schematically illustrates intelligent routing between multiple nodes.

FIG. 4 illustrates an example of intelligent routing in the security layer. In this example, radio is to be connected between two nodes which are labelled nodes 10 and 15. Extracts from the link discovery routing table information for each node is shown below with the corresponding portions of each table from each node compared side-by-side:

| Node 10 | Node 15 |
|---|---|
| Router OSPF 11 vrf link discovery | Router OSPF 11 vrf link discovery |
| Network 10.1.1.0 0.0.0.255 area 11 | Network 10.1.1.0 0.0.0.255 area 11 |
| Network 11.11.11.10 0.0.0.0 area 11 | Network 11.11.11.15 0.0.0.0 area 11 |
| Router OSPF 12 vrf link discovery | Router OSPF 12 vrf link discovery |
| Network 10.2.1.0 0.0.0.255 area 12 | Network 10.2.1.0 0.0.0.255 area 12 |
| Network 11.11.12.10 0.0.0.0 area 12 | Network 11.11.12.15 0.0.0.0 area 12 |
| Router OSPF 13 vrf link discovery | Router OSPF 13 vrf link discovery |
| Network 10.3.10.10 0.0.0.255 area 13 | Network 10.3.10.10 0.0.0.255 area 13 |
| Network 11.11.13.10 0.0.0.0 area 13 | Network 11.11.13.15 0.0.0.0 area 13 |
| Router OSPF 14 vrf link discovery | Router OSPF 14 vrf link discovery |
| Network 10.4.1.0 0.0.0.0 area 14 | Network 10.4.1.0 0.0.0.0 area 14 |
| Network 11.11.14.10 area 14 | Network 11.11.14.15 area 14 |
| Int Gi1 | Int Gi1 |
| Description L2 High Speed 1 | Description L2 High Speed 1 |
| Vrf link discovery | Vrf link discovery |
| IP address 10.1.1.10 255.255.255.0 | IP address 10.1.1.15 255.255.255.0 |
| Service-policy output Shaping 1 | Service-policy output Shaping 1 |
| Int Gi2 | Int Gi2 |
| Description L2 Low Speed 1 | Description L3 High Speed 1 |
| Vrf link discovery | Vrf link discovery |
| IP address 10.2.1.10 255.255.255.0 | IP address 10.3.10.15 255.255.255.0 |
| Service-policy output Shaping 2 | Service-policy output Shaping 1 |
| Int Gi3 | Int Gi3 |
| Description L3 High Speed 1 | Description L3 High Speed 1 |
| Vrf link discovery | Vrf link discovery |
| IP address 10.3.10.10 255.255.255.0 | IP address 10.4.10.15 255.255.255.0 |
| Service-policy output Shaping 1 | Service-policy output Shaping 1 |
| Int Gi4 | Int Gi4 |
| Description L3 High Speed 2 | Description L3 low Speed 2 |
| Vrf link discovery | Vrf link discovery |
| IP address 10.4.10.10 255.255.255.0 | IP address 10.2.1.15 255.255.255.0 |
| Service-policy output Shaping 1 | Service-policy output Shaping 2 |

As shown in the table extracts above, each router has a different routing instance configured for each interface (each with a unique loopback address) so that they are completely separated from one another. In this example, radio is plugged into L2 low speed 1 interface (int gi2) on node 10 and into the same L2 low speed 1 (int gi4) on node 15. These are shown in italics in the table above.

Applying the method of FIG. 2, node 10 connects to node 15 via the link discovery modules in each node. For each interface, node 10 learns the unique loopback address for node 15 so that separate tunnels can be created in the security layer for each interface. In this example, radio is connected using the unique address 11.11.12.15.

The link discovery routing table in node 10 thus contains the following information for the desired connection:

| | Address detail | Interface |
|---|---|---|
| C | 10.2.1.0/24 is directly connected | Int Gi2 |
| L | 50.50.50.1/32 is directly connected | Int Gi2 |
| O | 11.11.12.15/32 (110/1) via 10.2.1.15 | Int Gi2 |
| C | 11.11.12.10/32 is directly connected | Loopback1 |

Node 10 stores the information relating to each tunnel as illustrated below and the relevant address is highlighted in italics:

|  | Int Tun 11 | Int Tun 12 | Int Tun 13 | Int Tun 14 |
|---|---|---|---|---|
| Tunnel source | loopback 11 | loopback 12 | loopback 13 | loopback 14 |
| Tunnel destination | 11.11.11.15 | 11.11.12.15 | 11.11.13.15 | 11.11.14.15 |
| IP address | 60.60.60.1 255.255.255.252 | 60.60.60.5 255.255.255.252 | 60.60.60.9 255.255.255.252 | 60.60.60.13 255.255.255.252 |
| IP OSPF cost | 10 | 50 | 10 | 10 |
| Tunnel vrf | Link discovery | Link discovery | Link discovery | Link discovery |

Continuing the method of FIG. 2, another loopback address is learnt via the security tunnel. This loopback address is used for the secure access tunnel. The security routing table in node 10 thus contains the following information for the desired connection which includes the cost of 50 for tunnel 12:

|  | Address detail | Tunnel |
|---|---|---|
| C | 60.60.60.4/30 is directly connected | Tun12 |
| L | 60.60.60.5/32 is directly connected | Tun12 |
| O | 11.11.1.2 (110/50) via 10.1.1.15 | Tun12 |
| C | 11.11.1.1 is directly connected | Loopback1 |

Another node is added to the network, node 18. Node 18 connects to the L2 high speed link 1 (int Gi1) interface of node 10 and to the L3 high speed link 1 (int Gi2) interface of node 15. Using the method of FIG. 1, security tunnels are created between each node 10 and node 18 and between node 18 and node 15. In this example, each of these tunnels has a cost of 10. Accordingly, the total cost for node 10 to route traffic via node 18 to node 15 using these tunnels is 22 (sum of cost of each tunnel together with the number of hops). The security routing table above is thus updated as follows to show the new lower cost and thus more preferable route:

|  | Address detail | Tunnel |
|---|---|---|
| C | 60.60.60.4/30 is directly connected | Tun12 |
| L | 60.60.60.5/32 is directly connected | Tun12 |
| C | 61.61.61.0/30 is directly connected | Tun18 |
| L | 61.61.61.1/32 is directly connected | Tun18 |
| O | 11.11.1.2 (110/22) via 10.1.1.2 | Tun18 |
| C | 11.11.1.1 is directly connected | Loopback1 |

Terms such as 'component', 'module', 'processor' or 'unit' used herein may include, but are not limited to, a hardware device, such as circuitry in the form of discrete or integrated components, general processing units (GPUs), a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A method of creating a secure network or updating the secure network, the method comprising connecting a first router node to the network;
   discovering, using the first router node, a link to an adjacent router node within the network using a first interface;
   receiving, at the first router node via the discovered link using the first interface, a first loopback address for the adjacent router node, wherein the first loopback address is an address for a security module in the adjacent router node and is a network wide unique address;
   creating a first tunnel between a security module in the first router node and the received first loopback address;
   receiving, at the first router node via the first tunnel, a second loopback address for the adjacent router node using a second interface, wherein the second loopback address is an address for a secure access module in the adjacent router node and is a network wide unique address;
   creating a second tunnel between a secure access module in the first router node and the received second loopback address;
   repeating the discovering, receiving and creating steps for each router node which is adjacent to the first router node;
   storing information relating to the discovered links between the first router node and each adjacent router node in a link discovery routing table;
   storing the first loopback address for each adjacent router node in a security routing table; and
   storing the second loopback address for each adjacent router node in a secure access routing table;
   whereby each discovered link, first tunnel and second tunnel provide separate connections between the first router node and each adjacent router node, wherein the first interface and the second interface are different.

2. The method of claim 1, comprising configuring each of the first tunnels and each of the second tunnels to enable plug and play behaviour.

3. The method of claim 1, wherein creating one or both of the first tunnel and the second tunnel comprises using generic routing encapsulation.

4. The method of claim 1, wherein creating the first tunnel comprises applying security to the first tunnel before receiving the second loopback address.

5. The method of claim 1, wherein at least one of the link, the first tunnel and the second tunnel use the open shortest path first (OSPF) routing protocol.

6. The method of claim 1, wherein the link is a wide area network link.

7. The method of claim 1, further comprising storing details of any local area network connected to the adjacent router node.

8. The method of claim 1, further comprising
sending to each adjacent router node, via the discovered link, a unique first loopback address for the security module in the first router node; and
sending to each adjacent router node via the first tunnel, a unique second loopback address for the secure access module in the first router node.

9. The method of claim 1, comprising pre-configuring the first router node with a number of first loopback addresses corresponding to the number of nodes within the network and a number of second loopback addresses corresponding to the number of nodes within the network.

10. A method of routing traffic across the secure network created using the method of claim 1.

11. The method of claim 10, the method comprising using intelligent routing when routing user traffic across the network through the first tunnels between the first router node and each adjacent router node.

12. The method of claim 11, comprising selecting which of the first and second tunnels to use to route incoming user traffic.

13. A router node comprising a link discovery module having a first interface, a security module having a second interface, a secure access module having a third interface, and storage, where the first interface, the second interface and the third interface are different,
wherein the link discovery module is configured to
discover a link to an adjacent router node in a network to which the router node is connected using the first interface;
receive a first loopback address for the adjacent router node using the first interface, wherein the first loopback address is an address for a security module in the adjacent router node and is a network wide unique address;
create a first tunnel between the security module in the router node and the received first loopback address;
wherein the security module is configured to
receive a second loopback address for the adjacent router node using the second interface, wherein the second loopback address is an address for a secure access module in the adjacent router node and is a network wide unique address; and
create a second tunnel between the secure access module in the router node and the received second loopback address;
repeating the discovering, receiving and creating for each router node which is adjacent to the first-router node; and
wherein the storage is configured to separately store a link discovery routing table which comprises information relating to the discovered links between the router node and each adjacent router node; a security routing table which stores the first loopback address for each adjacent router node; and a secure access routing table which stores the second loopback address for each adjacent router node.

14. The router of claim 13, wherein the security module is configured to use intelligent routing to determine an optimal path through the network.

15. A network comprising a plurality of interconnected router nodes according to claim 13, wherein the network comprises a link discovery layer providing a plurality of links between adjacent router nodes, a security layer providing a plurality of first tunnels, one between each pair of adjacent router nodes and a secure access layer providing a plurality of second tunnels, one between each pair of adjacent router nodes.

16. The method of claim 2, wherein creating one or both of the first tunnel and the second tunnel comprises using generic routing encapsulation.

17. The method of claim 2, wherein creating the first tunnel comprises applying security to the first tunnel before receiving the second loopback address.

18. The method of claim 3, wherein creating the first tunnel comprises applying security to the first tunnel before receiving the second loopback address.

19. The method of claim 2, further comprising storing details of any local area network connected to the adjacent router node.

20. The method of claim 3, further comprising storing details of any local area network connected to the adjacent router node.

* * * * *